US011226312B1

(12) United States Patent
Remillieux et al.

(10) Patent No.: US 11,226,312 B1
(45) Date of Patent: Jan. 18, 2022

(54) IN-PROCESS, LAYER-BY-LAYER NON-DESTRUCTIVE TESTING OF ADDITIVE MANUFACTURED COMPONENTS USING LINEAR AND NONLINEAR VIBRATIONAL RESONANCE

(71) Applicant: LOS ALAMOS NATIONAL SECURITY, LLC, Los Alamos, NM (US)

(72) Inventors: Marcel Remillieux, Los Alamos, NM (US); Carly M. Donahue, Los Alamos, NM (US); Marcie A. Stuber Geesey, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 0 days.

(21) Appl. No.: 16/054,932

(22) Filed: Aug. 3, 2018

Related U.S. Application Data

(60) Provisional application No. 62/540,992, filed on Aug. 3, 2017.

(51) Int. Cl.
*B29C 64/153* (2017.01)
*G01N 29/04* (2006.01)
*G01M 5/00* (2006.01)
*G01M 7/02* (2006.01)
*B33Y 40/00* (2020.01)
*B33Y 30/00* (2015.01)

(52) U.S. Cl.
CPC ......... *G01N 29/045* (2013.01); *B29C 64/153* (2017.08); *G01M 5/0066* (2013.01); *G01M 7/025* (2013.01); *B33Y 30/00* (2014.12); *B33Y 40/00* (2014.12)

(58) Field of Classification Search
CPC .................................................. G01M 5/0066
See application file for complete search history.

(56) References Cited

U.S. PATENT DOCUMENTS

| 6,330,827 | B1 * | 12/2001 | Johnson ................. G01N 29/12 73/579 |
| 2017/0146489 | A1 * | 5/2017 | Redding ............ G01N 29/2418 |
| 2018/0164383 | A1 * | 6/2018 | Hsieh ................. G01R 31/3842 |
| 2019/0015901 | A1 * | 1/2019 | Haberland ............. B33Y 10/00 |

OTHER PUBLICATIONS

Gatto, et al. "Non-destructive analysis (NDA) of external and internal structures in 3DP" Rapid Prototyping Journal 17, 2011, 10 pages.

(Continued)

*Primary Examiner* — Herbert K Roberts
(74) *Attorney, Agent, or Firm* — Lewis Roca Rothgerber Christie LLP

(57) ABSTRACT

Provided is an additive manufacturing system capable of performing in-process, layer-by-layer non-destructive testing, the additive manufacturing system including: a plate for producing a part thereon; a transducer attached to the plate and configured to induce vibrations in the part; and a laser vibrometer configured to detect a vibrational response of the part to determine whether defect and/or anisotropy exists within the part.

14 Claims, 17 Drawing Sheets
(16 of 17 Drawing Sheet(s) Filed in Color)

(56) References Cited

OTHER PUBLICATIONS

Rawal et al. "Additive Manufacturing of Ti—6AI—4V Alloy Components for Spacecraft Applications", *2013 6th International Conference on Recent Advances in Space Technologies (RAST)*, 2013, pp. 5-11.
Rieder et al. "Online Monitoring of Additive Manufacturing Processes Using Ultrasound", 11th European Conference on Non-Destructive Testing (ECNDT 2014), Oct. 6-10, 2014, Prague, Czech Republic, 8 pages.
Rudlin et al. "Inspection of Laser Powder Deposited Layers", 11th European Conference on Non-Destructive Testing (ECNDT 2014), Oct. 6-10, 2014, Prague, Czech Republic, 10 pages.
Slotwinski, et al. "Porosity Measurements and Analysis for Metal Additive Manufacturing Process Control" Journal of Research of the National Institute of Standards and Technology, Sep. 16, 2014, 35 pages.
Waller, et al. "Nondestructive Evaluation of Additive Manufacturing State-of-the-Discipline Report" Edward R. Generazio National Aeronautics and Space Administration Langley Research Center Hampton, Virginia, Nov. 2014, 47 pages.

* cited by examiner $\alpha_{A7} = 182$ $\alpha_{B7} = 229$ $\alpha_{C7} = 175$ $\alpha_{D7} = 178$

IN-PROCESS, LAYER-BY-LAYER NON-DESTRUCTIVE TESTING OF ADDITIVE MANUFACTURED COMPONENTS USING LINEAR AND NONLINEAR VIBRATIONAL RESONANCE

CROSS-REFERENCE TO RELATED APPLICATION(S)

This application claims priority to and the benefit of U.S. Provisional Application Ser. No. 62/540,992 filed on Aug. 3, 2017 and titled IN-PROCESS, LAYER-BY-LAYER NON-DESTRUCTIVE TESTING OF ADDITIVE MANUFACTURED COMPONENTS USING LINEAR AND NON-LINEAR VIBRATIONAL RESONANCE, the entire content of which is incorporated herein by reference.

STATEMENT REGARDING FEDERALLY SPONSORED RESEARCH OR DEVELOPMENT

This invention was made with government support under Contract No. DE-AC52-06NA25396 awarded by the United States Department of Energy and Los Alamos National Security, LLC for the operation of Los Alamos National Laboratory. The government has certain rights in the invention.

FIELD

One or more aspects of embodiments according to the present invention relate to additive manufacturing and, more particularly, to in-process, layer-by-layer non-destructive testing of additive manufactured components utilizing linear and nonlinear vibrational resonance.

BACKGROUND

Additive manufacturing (AM) has recently become one of the most dynamic and promising industrial processes because it offers the ability to produce parts of complex shapes with significant cost savings and at much smaller scrap rates compared to traditional processes involving machine-cutting tools or casting. In some cases, the part has such a sophisticated shape that it is not simple (e.g., not possible) to create it with traditional manufacturing processes. As AM technologies are considered for aerospace uses (e.g., NASA space flights, space stations, etc.), it may be useful to evaluate the surface state and internal structure of parts manufactured with these technologies for the presence of defects (e.g., micro-cracking resulting from residual stress, gas porosity, and/or regions of incomplete melt).

A recent study evaluated the structural properties of Ti-6Al-4V alloy brackets manufactured by Arcam-based electron beam melting (EBM) AM processing (See Appendix I, Rawal, S., Brantley, J. and Karabudak, N., "Additive manufacturing of Ti-6Al-4V alloy components for spacecraft applications," In *Proceedings of 6th International Conference on Recent Advances in Space Technologies (RAST)*, June 2013). The study was based on destructive tests and reported yield strength, elastic modulus, ultimate strength, and percentage elongation, both at room temperature and at 121° C. The study concludes that the bulk properties of the EBM-processed components were nearly equivalent to the wrought and machined ones. Eventually, the EBM-processed components (wave guide brackets) were used on the Juno spacecraft, which was launched successfully on Aug. 5, 2011. More importantly and concerning, the study also revealed that the tensile strength was dependent on the orientation of the EBM processing.

This anisotropy of the structural properties, if unwanted or not fully characterized, can have dramatic consequences. Anisotropy was revealed via a simple tensile test but was not quantified precisely. Accordingly, there is a need for a method that can identify how anisotropic the final part is (e.g., if the part has 3, 5, 9 or more independent elastic constants in the elastic tensor). Furthermore, optical imaging of the fractured sample indicated some localized regions of incomplete melt. However, these were internal defects visually identified on the fracture surface, and there is a need for a method that can identify how many of these defects are present in the final part.

SUMMARY

Aspects of embodiments according to the present invention are directed towards in-process, layer-by-layer non-destructive testing of additive manufactured components utilizing linear and nonlinear vibrational resonance.

According to an embodiment of the present invention, there is provided an additive manufacturing system capable of performing in-process, layer-by-layer non-destructive testing, the additive manufacturing system including: a plate for producing a part thereon; a transducer attached to the plate and configured to induce vibrations in the part; and a laser vibrometer configured to detect a vibrational response of the part to determine whether defect and/or anisotropy exists within the part.

The additive manufacturing system may be any system capable of performing a manufacturing process in which parts are formed via additive, stepwise deposition of layers of material. For example, the additive manufacturing system may be a powder bed fusion system. The additive manufacturing system may be a three-dimensional (3D) printer. Inducing vibrations in the part may include oscillating the part at multiple successive frequencies within a defined frequency band. Detecting the vibrational response may include detecting a magnitude and a phase of the vibration within the part. Inducing vibrations in the part may include oscillating the part at one or more vibrational resonance modes of the part at multiple amplitudes. Detecting the vibrational response may include measuring a shift in a resonance frequency of the part based on the multiple amplitudes.

According to an embodiment of the present invention, there is provided a method of determining whether defects and/or anisotropy exists within a part created by or being created by an additive manufacturing system, the method including: inducing vibrations within the part; detecting a vibrational response of the part based on the induced vibrations; and determining whether defects and/or anisotropy exist within the part.

The additive manufacturing system may be a powder bed fusion system. The additive manufacturing system may be a three-dimensional (3D) printer. Inducing vibrations in the part may include oscillating the part at multiple successive frequencies within a defined frequency band. Detecting the vibrational response may include detecting a magnitude and a phase of the vibration within the part. Inducing vibrations in the part may include oscillating the part at one or more vibrational resonance modes of the part at multiple amplitudes. Detecting the vibrational response may include measuring a shift in a resonance frequency of the part based on the multiple amplitudes.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features and aspects of the present invention will be appreciated and understood with reference to the specification, claims, and appended drawings wherein:

DETAILED DESCRIPTION

Figure 1:
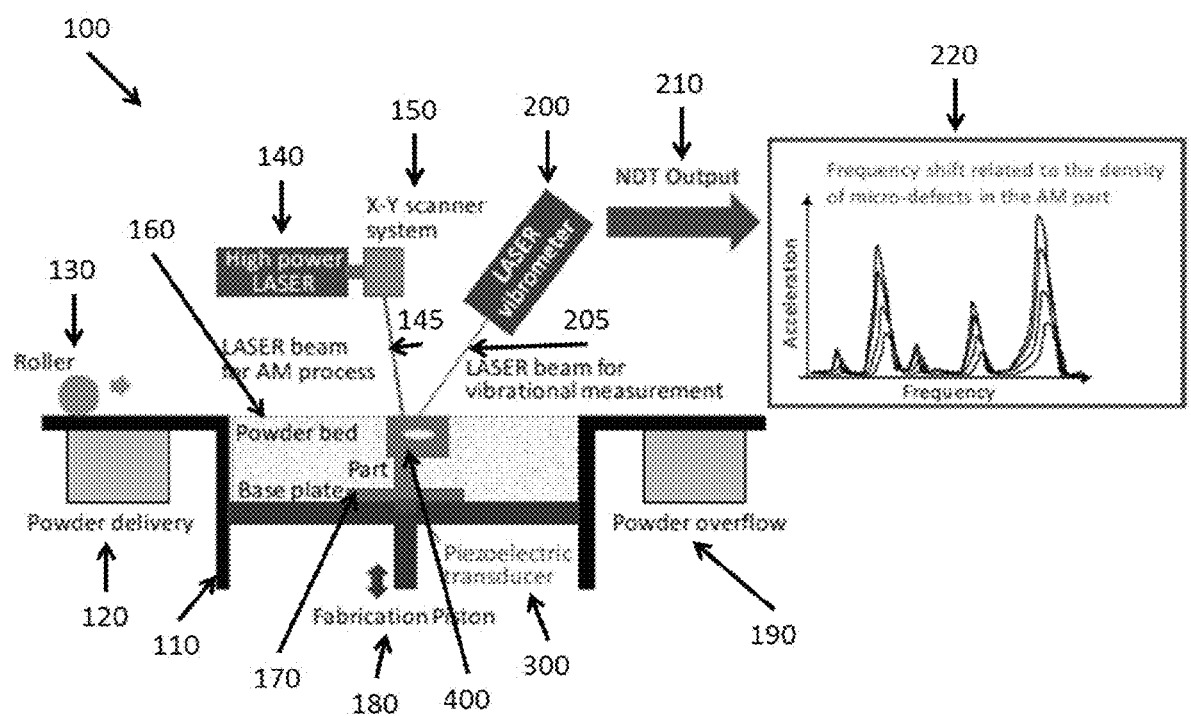
FIG. 1 is block diagram of a powder bed fusion system according to an embodiment of the present invention.

Aspects of embodiments according to the present invention relate to in-process, layer-by-layer non-destructive testing of additive manufactured components utilizing linear and nonlinear vibrational resonance.

The detailed description set forth below in connection with the appended drawings is intended as a description of exemplary embodiments of the present invention provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

The following invention relates to the quantification of anisotropy and the detection of defects (e.g., micro-cracking resulting from residual stress, gas porosity, and/or regions of incomplete melt) within components created by additive manufacturing (AM) processes. The proposed technology can be applied for in-process layer-by-layer inspection of AM components.

Anisotropy occurs when an object has a different stiffness and/or rigidity in one direction that it has in another direction. In some applications, anisotropy is desirable and in other applications, it is not desirable or irrelevant. In additive manufacturing processes, layers are added one at a time which may produce anisotropy, which may not be desirable.

Embodiments of the present invention are compact and are implemented in the existing equipment used for additive manufacturing. Embodiments of the present invention are based on the vibrational resonant response of the component to be tested and probe the properties of interest in the entire volume of the component. Embodiments of the present invention have a linear component to measure the full elastic tensor and thus quantify the anisotropy of the AM material, and have a nonlinear component to detect and quantify the density of internal defects in the AM sample.

The quality control on AM parts is desirably as specific and stringent as the targeted application. For example, during a space flight the AM parts will not only be exposed to static loads but also to severe dynamic solicitations and temperature gradients.

Embodiments of the present invention utilize nondestructive testing (NDT) technologies to control the quality of output from an additive manufacturing process. Embodiments of the present invention are (1) compact enough to fit within the AM environment, (2) fast enough to allow layer-by-layer quality inspection during the additive process, and (3) highly sensitive to the typical defects found in AM parts.

Embodiments of the present invention are based on the vibrational resonant response of the sample to be tested. Embodiments of the present invention have a nonlinear component to detect and quantify the density of internal defects in the AM sample and a linear component to measure the full elastic tensor and thus quantify the anisotropy of the AM material.

FIG. 1 is block diagram of a powder bed fusion system according to an embodiment of the present invention. While, the embodiment represented in FIG. 1 utilizes a powder bed fusion system, embodiments of the present invention are not limited thereto and may be applied to any process or system where a component is created by adding material on top of a base plate (e.g., Acrylonitrile-Butadiene-Styrene (ABS) plastics in 3D printing).

Referring to FIG. 1, a powder bed fusion system 100 includes a frame 110, powder delivery system 120, a roller 130, a high power laser 140, an X-Y scanner system 150, a powder bed 160, a base plate 170, a fabrication piston 180, a powder overflow area 190, a laser vibrometer 200, and a piezoelectric transducer 300.

The powder bed fusion system 100 is an additive manufacturing system. The powder bed fusion system 100 is capable of producing a part 400 utilizing the frame 110, the powder delivery system 120, the roller 130, the high power laser 140, the X-Y scanner system 150, the powder bed 160, the base plate 170, the fabrication piston 180, and the powder overflow area 190. The high power laser 140 generates the laser beam 145 which travels through the X-Y scanner system before being incident upon the part 400 that is being produced.

The piezoelectric transducer 300 is affixed underneath the base plate and is used as a vibrational source to excite the system base plate sample (e.g., the part 400). The laser vibrometer 200 (e.g., a laser Doppler vibrometer) is used to measure the vibrational response at a point on an exposed surface (e.g., a top surface corresponding to the last layer of added material) of the part 400 being processed. This apparatus (the vibrometer 200 and the piezoelectric transducer 300) is utilized to implement the non-destructive inspection techniques described below, namely Resonant Ultrasound Spectroscopy (RUS) and Nonlinear Elastic Wave Spectroscopy (NEWS).

Anisotropy may be quantified utilizing RUS. RUS is a laboratory technique used to measure the elastic properties (i.e., full elastic tensor) of solids in numerous research fields including materials science, geophysics, and biomedical engineering. In brief, RUS is a technique used to retrieve the elastic tensor of a material (of possibly general anisotropy with up to 21 independent elastic constants) from a single resonance test. A typical RUS experiment consists of oscillating a sample at multiple successive frequencies within a defined frequency band while recording the vibrational response (magnitude and phase) of the sample. The predicted resonance frequencies of the sample are compared to the measured resonance frequencies and the sum of the squared differences between the two sets is minimized by adjusting the elastic constants. Embodiments of the present invention may utilize a modified RUS formulation to make it applicable to samples with non-trivial geometries and boundary conditions.

Detection and quantification of defects (e.g., micro-cracking resulting from residual stress, gas porosity, regions of incomplete melt) may be performed utilizing Nonlinear Elastic Wave Spectroscopy (NEWS). NEWS encompasses a set of techniques relying on the basic idea that material defects lead to nonlinear effects during the propagation of elastic waves, manifested as wave distortions in the time domain or generation of harmonics in the frequency domain. This property is unique to materials with internal defects. A material free of these defects will not cause the wave to distort. The characterization of the wave distortion is the heart of NEWS. These techniques have been developed because nonlinear acoustic signatures are far more sensitive to the presence of early and barely-visible defects than linear acoustic signatures.

To describe NEWS, let us start with the analogy of the bell. If a bell is struck, it rings at a tone defined by its resonance modes. If the bell is struck harder, it rings at the same tone, only louder. Let us now consider a small crack in the bell, perhaps invisible to the eye. If the bell is struck gently, it rings normally. Striking it harder we find that the tone drops in frequency. Striking it even harder, the tone drops farther down in frequency. The frequency shift is a manifestation of nonlinearity due to the presence of the crack.

The part 400, created utilizing AM, will be of finite size, will vibrate around its own modes of vibration, and so it will be possible to conduct a nonlinear resonance tests on one or several modes of vibration. If internal defects are present in the part 400, the resonance frequency will shift with increasing source amplitude, with a magnitude of the shift related to the density of internal defects. The NEWS procedure can be applied during the manufacturing process or on the finished AM component since at any given point in time, the exact geometry of the AM component is known.

To perform a NEWS inspection, one or several resonance modes of vibration (i.e., vibrational resonance modes) of the sample are selected, within the frequency band spanned by the source. The frequency sweep is performed at multiple amplitudes. The shift of the resonance frequency of the sample can be measured by the laser vibrometer 200, utilizing laser beam 205, and output as NDT Output 210.

Further, the shift of the resonance frequency can be quantified for the sample under inspection. See graph 220 (FIG. 1) showing sample NDT Output 210 (the frequency shift is related to the existence or density of micro-defects within the AM part).

In this manner (utilizing RUS and NEWS), the vibrometer 200 and the piezoelectric transducer 300 can be utilized to determine whether anisotropy and/or defects are present within a part 400. These techniques can be performed while the part 400 is being produced (e.g., between the addition of layers) or after the part 400 is complete. If these techniques are being performed while the part 400 is being produced, they can be performed after each layer is added or after every set number of layers has been added (e.g., after every 5 layer, after every 10 layers, etc.).

Further, when anisotropy or defects are detected, parameters of the powder bed fusion system 100 may be modified to reduce or prevent the occurrence of future anisotropy or defects. For example, a temperature of the base plate may be changed or the intensity of the laser beam 145 may be adjusted. These adjustments may be performed while the part 400 is being produced in order to produce a part 400 with high quality.

Figure 2:
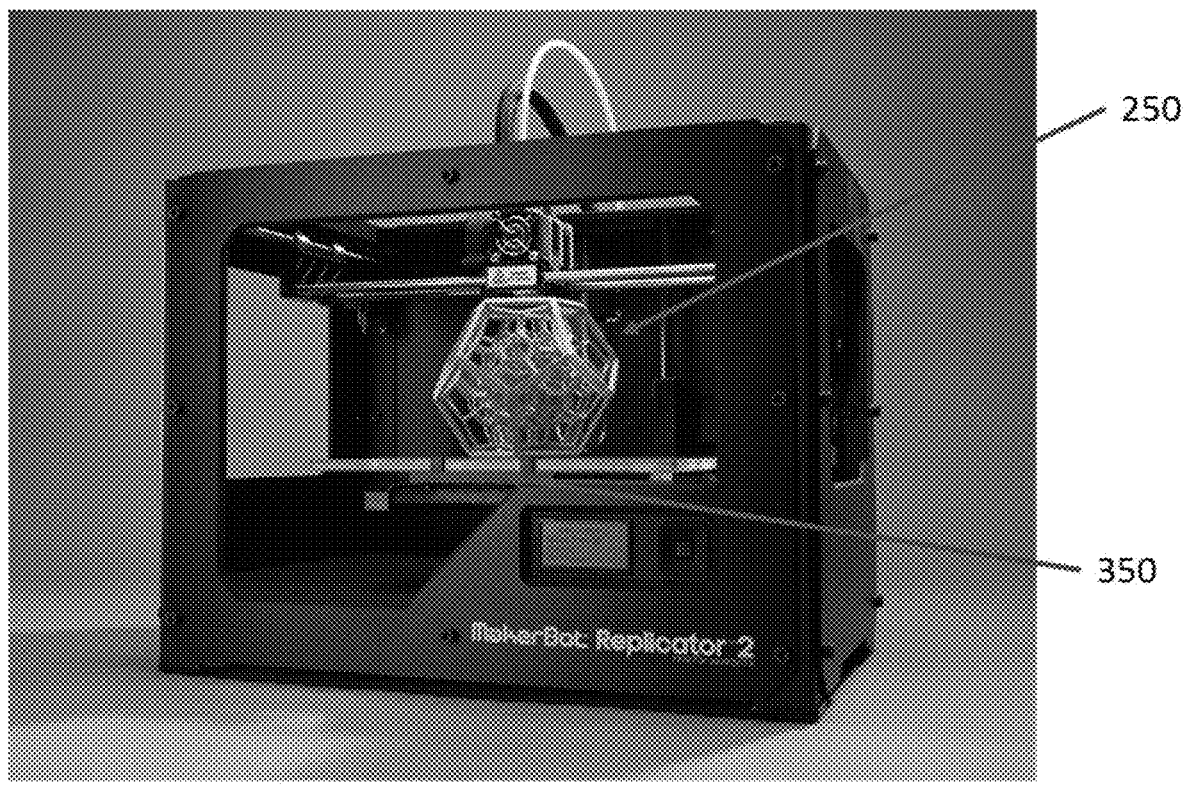
FIG. 2 is an image of an example 3D printer for use in describing an embodiment of the present invention.

FIG. 2 is an image of an example 3D printer for utilization in describing an embodiment of the present invention. The MakerBot Replicator 2 is merely used as an example and embodiments of the present invention may be applied to virtually any type (or kind) of 3D printer or any other additive manufacturing system.

Referring to FIG. 2, a laser vibrometer 250 and a transducer 350 are included in the example 3D printer. The reference numerals 250 and 350 point to where the laser vibrometer 250 and the transducer 350 may be added to the example 3D printer, which are not shown in FIG. 2. However, this illustration is not intended to limit the present embodiments, and the laser vibrometer and the transducer may be added to any suitable location in the corresponding AM system.

Figure 13:
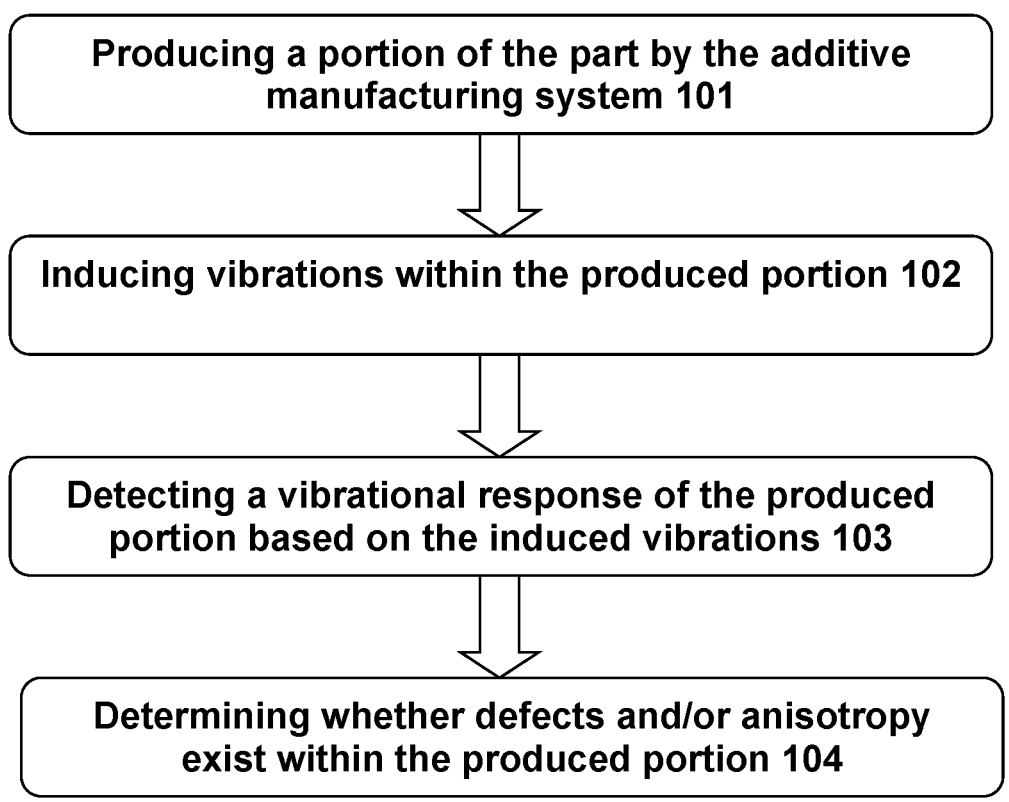
FIG. 13 is a flowchart illustrating a method of manufacturing a part according to an embodiment of the present disclosure.

FIG. 13 is a flowchart of a method of manufacturing a part by an additive manufacturing system according to one or more embodiments of the present disclosure. The method may include the acts of producing a portion of the part by the additive manufacturing system 101, inducing vibrations within the produced portion 102, detecting a vibrational response of the produced portion based on the induced vibrations 103, and determining whether defects and/or anisotropy exist within the produced portion 104.

Hereinafter, the present disclosure will be described with reference to Experimental Examples. It will be understood, however, that these examples are provided for illustrative purposes only, and do not in any way limit the present disclosure.

EXPERIMENTAL EXAMPLES

Quantification of Nonlinear Elasticity in AM Plastic Samples Using Nonlinear Elastic Wave Spectroscopy (NEWS)

Figure 3A:
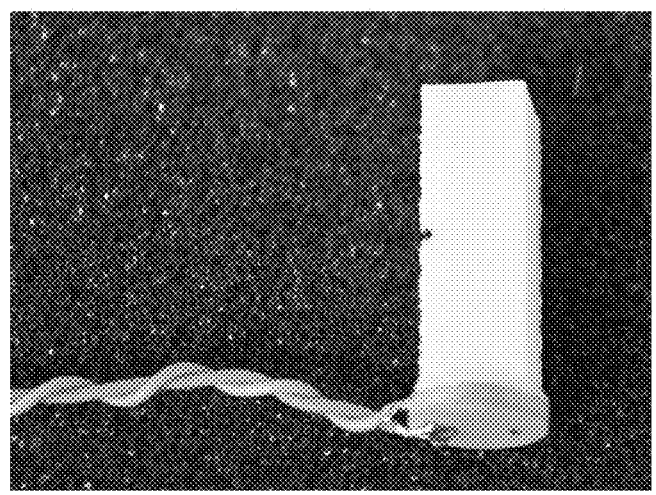
FIG. 3A is an image of the AM plastic sample instrumented with a piezoelectric transducer.
Figure 3B:
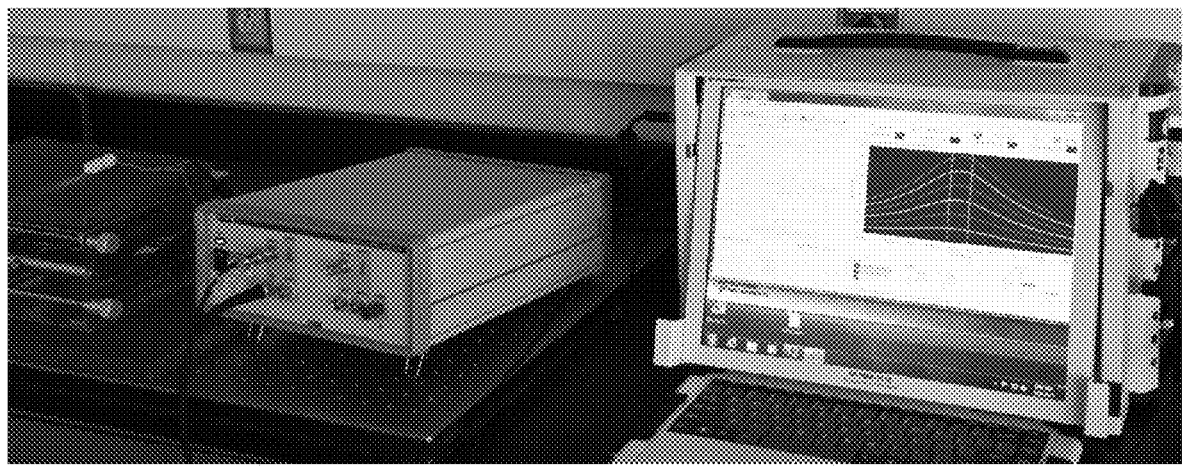
FIG. 3B is an image of an experimental set-up for Quantification of nonlinear elasticity in AM plastic samples using Nonlinear Elastic Wave Spectroscopy (NEWS).

Plastic AM samples A7, B7, C7, and D7 were tested using a piezoelectric transducer and a laser vibrometer akin to the those described in the instant application. Each sample consisted of an acrylonitrile butadiene styrene (ABS) square column, with a side length of 10 mm and a height of 30 mm (3:1 aspect ratio). Each sample was equipped with a piezoelectric transducer, as shown in FIG. 3A. The samples were vibrated around two of their resonance modes ($2^{nd}$ and $3^{rd}$ longitudinal) at increasing source amplitudes. The vibration response of each sample was measured on the side opposite to the transducer, using a laser vibrometer. The experimental setup is shown in FIG. 3B.

Figure 4A:
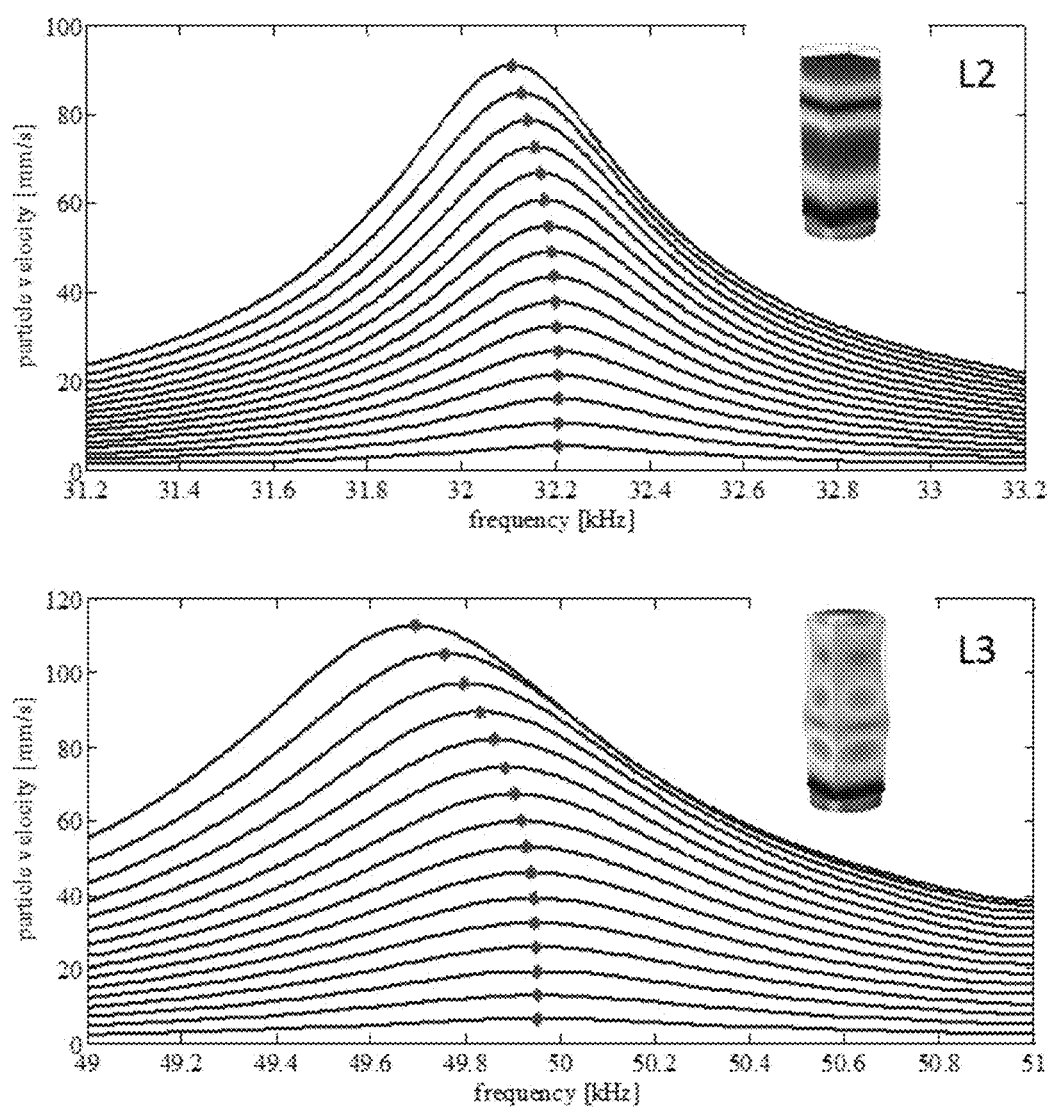
FIG. 4A are plots of the results for sample A7.
Figure 4B:
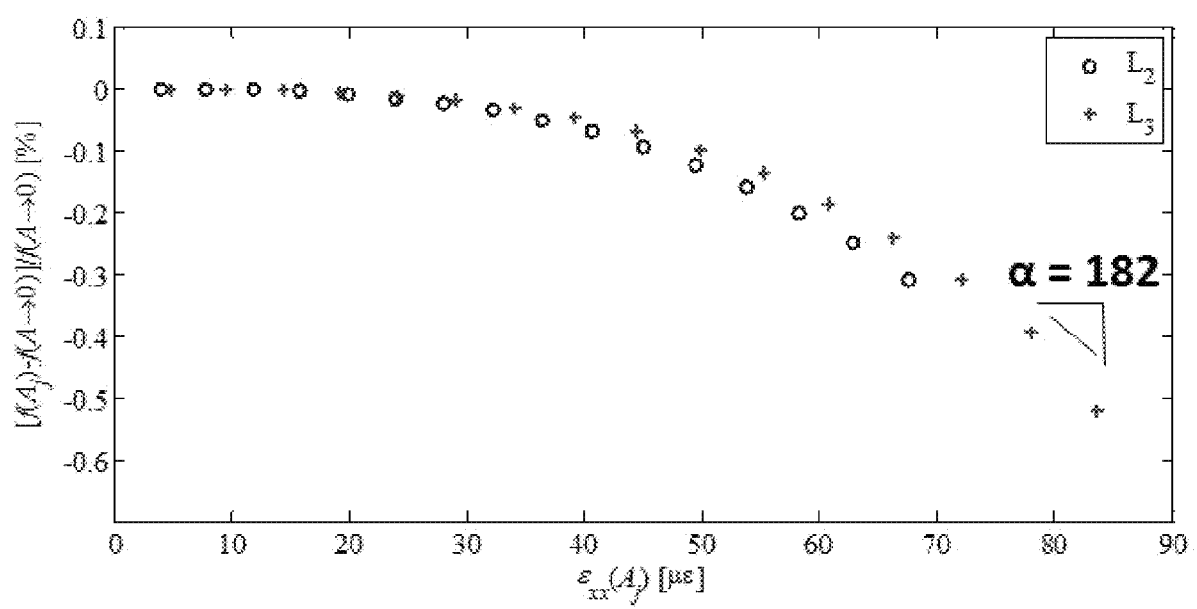
FIG. 4B is a reduced data plot of FIG. 4A.
Figure 5A:
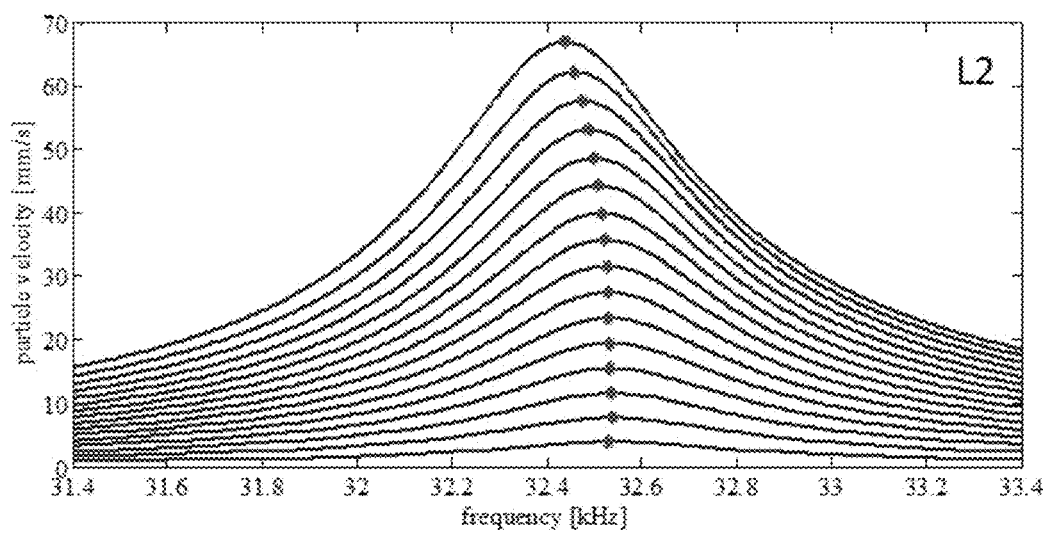
FIG. 5A are plots of the results for sample B7.
Figure 5A:
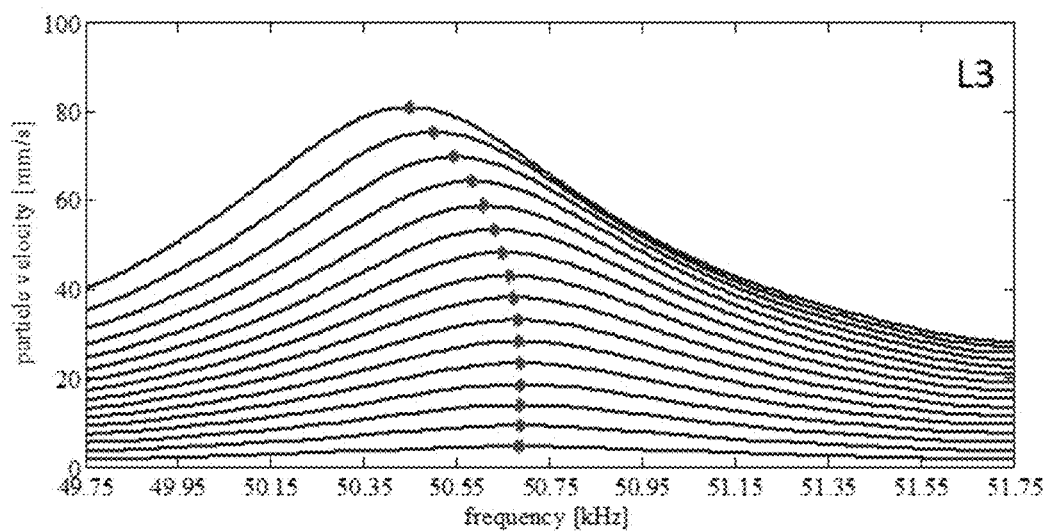
Figure 5B:
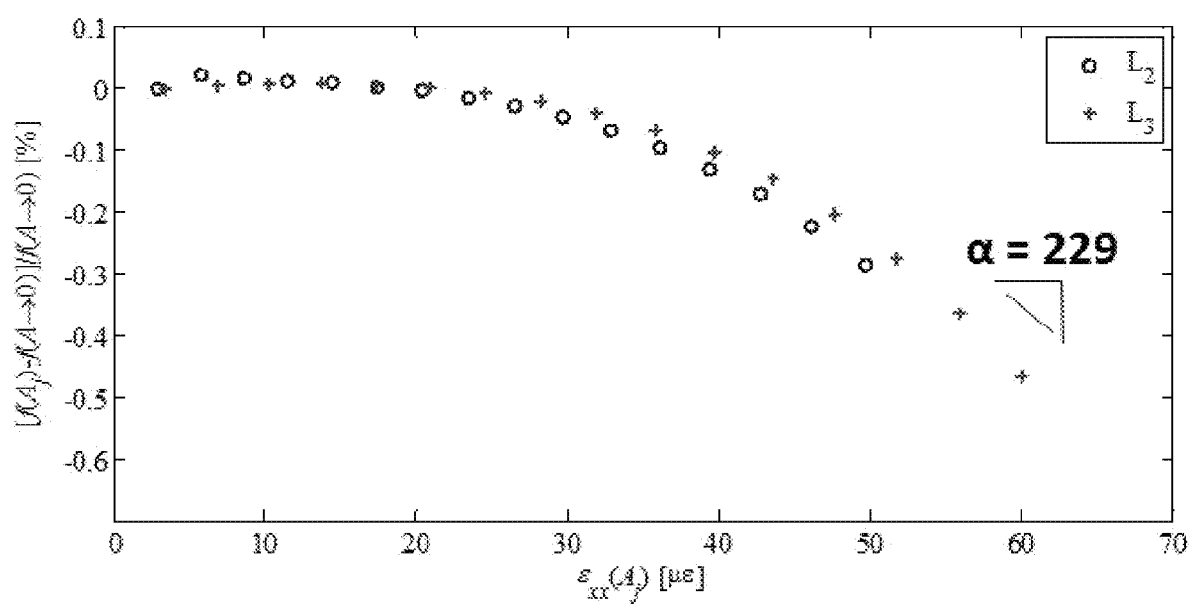
FIG. 5B is a reduced data plot of FIG. 5A.
Figure 6A:
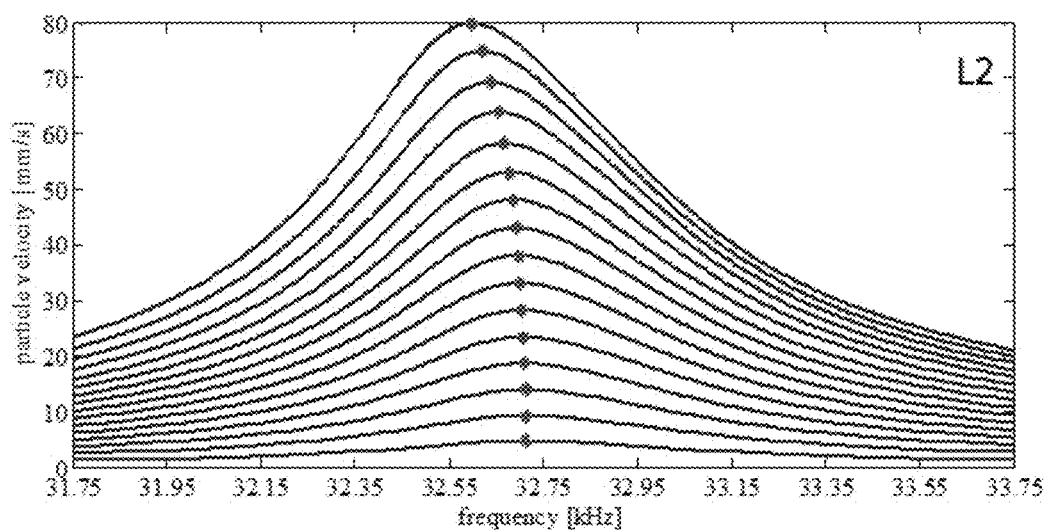
FIG. 6A are plots of the results for sample C7.
Figure 6A:
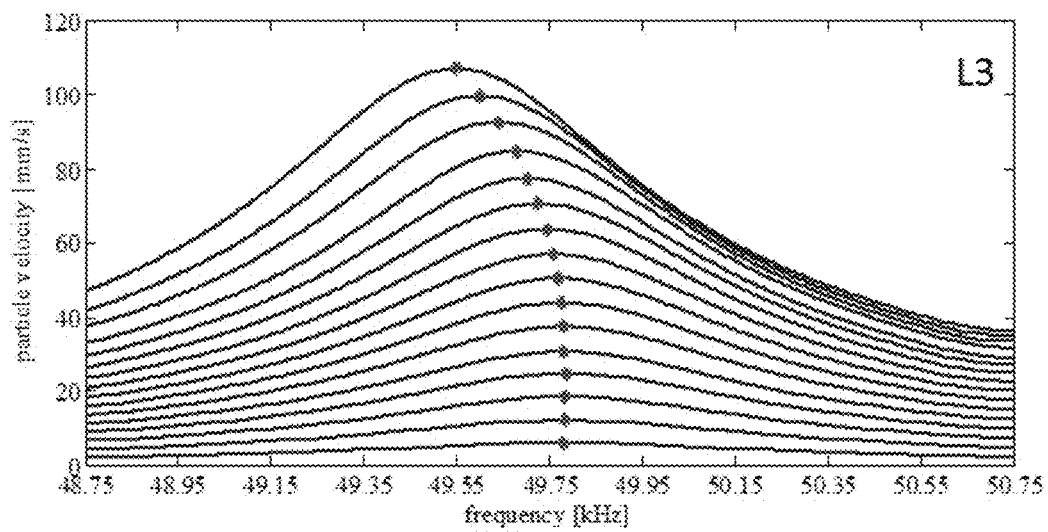
Figure 6B:
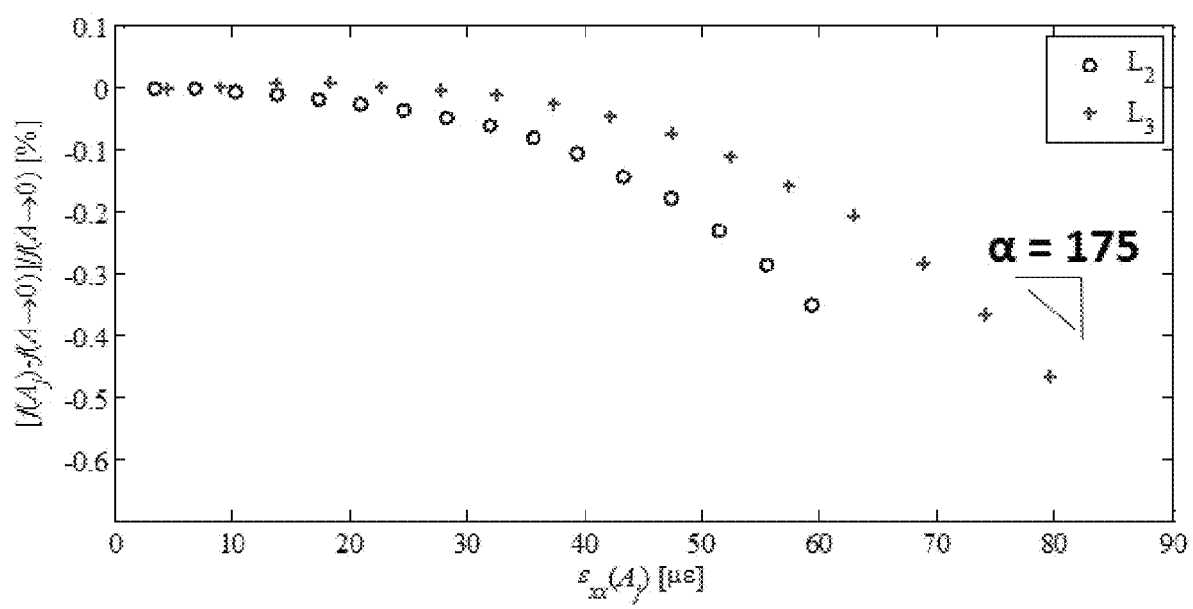
FIG. 6B is a reduced data plot of FIG. 6A.
Figure 7A:
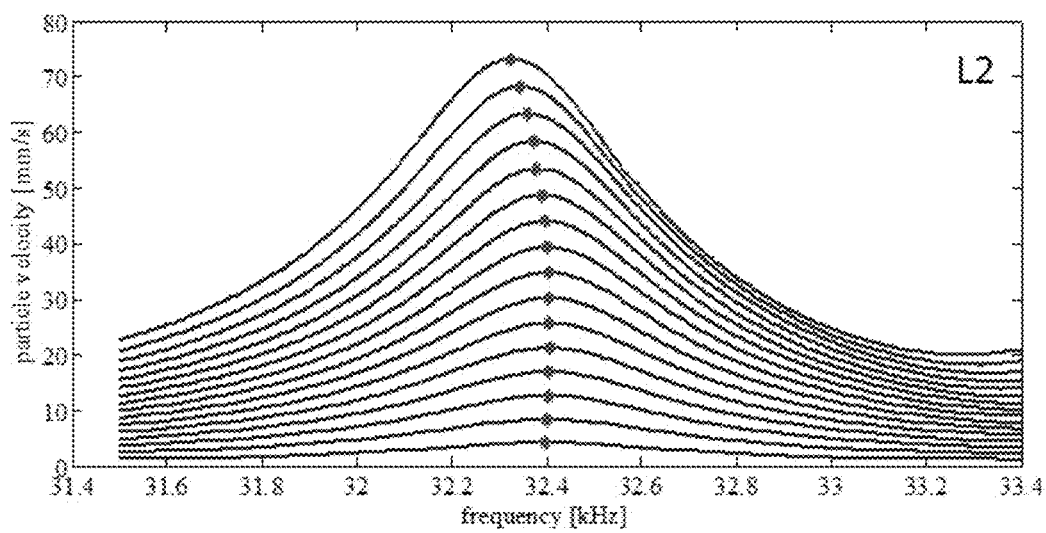
FIG. 7A are plots of the results for sample D7.
Figure 7A:
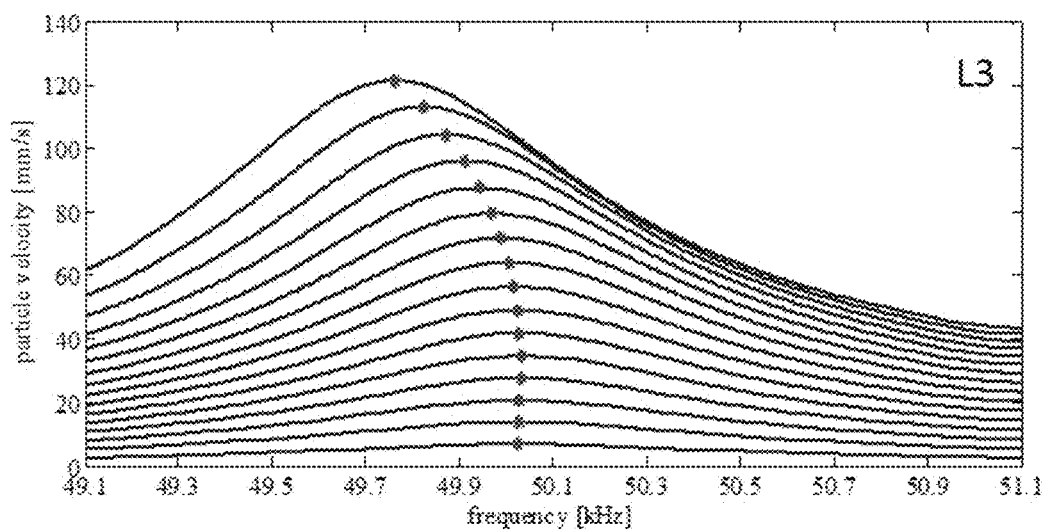
Figure 7B:
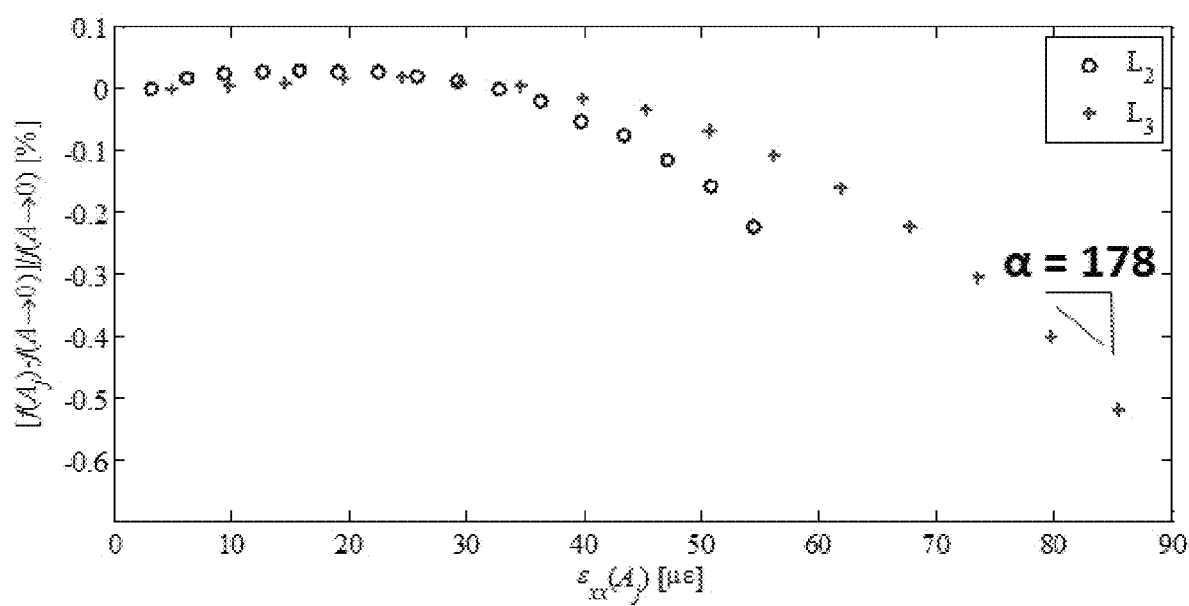
FIG. 7B is a reduced data plot of FIG. 7A.

Plots of the results for the $2^{nd}$ and $3^{rd}$ longitudinal resonance modes (L2 and L3, respectively) of sample A7 are provided in FIG. 4A. The data from the plots in FIG. 4A was reduced by looking at the relative shift of the resonance frequency as a function of strain. The resulting plot is shown in FIG. 4B. In FIG. 4B, parameter a refers to the slope of the relative shift as a function of the strain, which fits a 1D equation of state for the modulus. Unlike a linear material, the resonance frequency of the nonlinear elastic material is dependent on the strain amplitude. Plots of the results for $2^{nd}$ and $3^{rd}$ longitudinal resonance modes of each of the samples B7, C7, and D7 are shown in FIGS. 5A, 6A, and 7A, respectively. The reduced data plots for these samples are shown in FIGS. 5B, 6B, and 7B, respectively.

Figure 8:
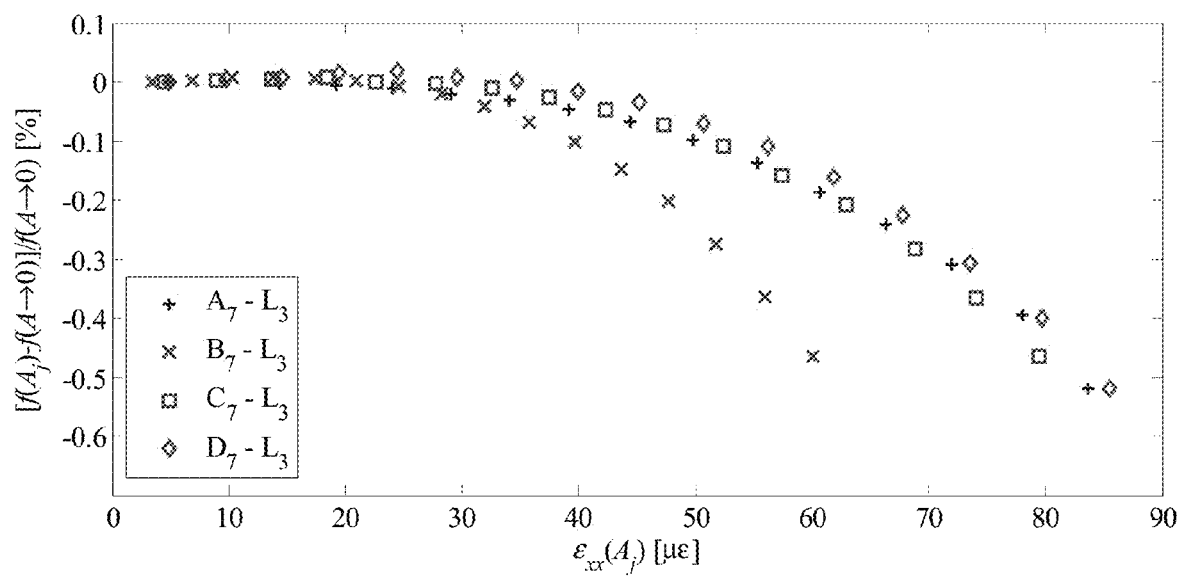
FIG. 8 is a comparison graph of the reduced data plots of each of the samples A7, B7, C7, and D7.

The reduced data plots for the $3^{rd}$ longitudinal resonance mode (L3) of each of the samples A7, B7, C7, and D7 were compared, and the results are shown in FIG. 8. Mode L3 was selected for comparison as the mode giving the highest vibration output, thus getting well into the nonlinear regime.

As can be seen from the results shown in FIG. 8, the nonlinear curves for samples A7, C7, and D7 nearly superimpose. However, the nonlinear curve for sample B7 clearly stands out, with a difference of 26% between samples A7 and B7. The significantly higher amount of nonlinearity in sample B7 indicates a significantly larger density of micro-defects.

Figure 9:
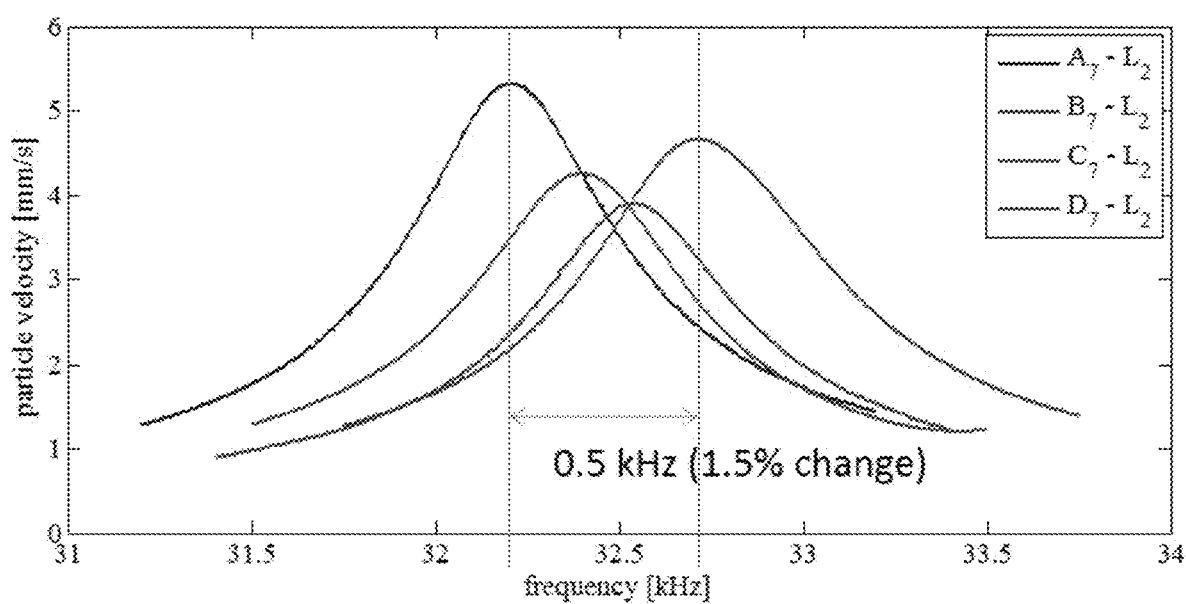
FIG. 9 is a linear case resonance curve for each of the samples A7-D7.

In contrast to the above-described nonlinear elasticity analysis using NEWS, the linear analysis failed to discover samples with comparatively larger density of micro-defects. For example, a resonance curve for the mode L2 at the lowest excitation amplitude (linear case) was plotted for each of the samples A7-D7, and is shown in FIG. 9. As can be seen from this curve, the frequency span between resonance frequencies of mode L2 for all the samples was about 0.5 kHz, which corresponds to about 1.5% change (when taking a frequency of 32.2 kHz as a reference point). Accordingly, the samples could not be discriminated (or selected) based on the change in linear frequencies. While there was a difference in the change in amplitude, no definitive conclusion regarding the samples could be derived, and the change could have been a mere coincidence.

Quantification of Nonlinear Elasticity in Metallic AM Samples Using Nonlinear Resonant Ultrasound Spectroscopy (NRUS)

Figure 10:
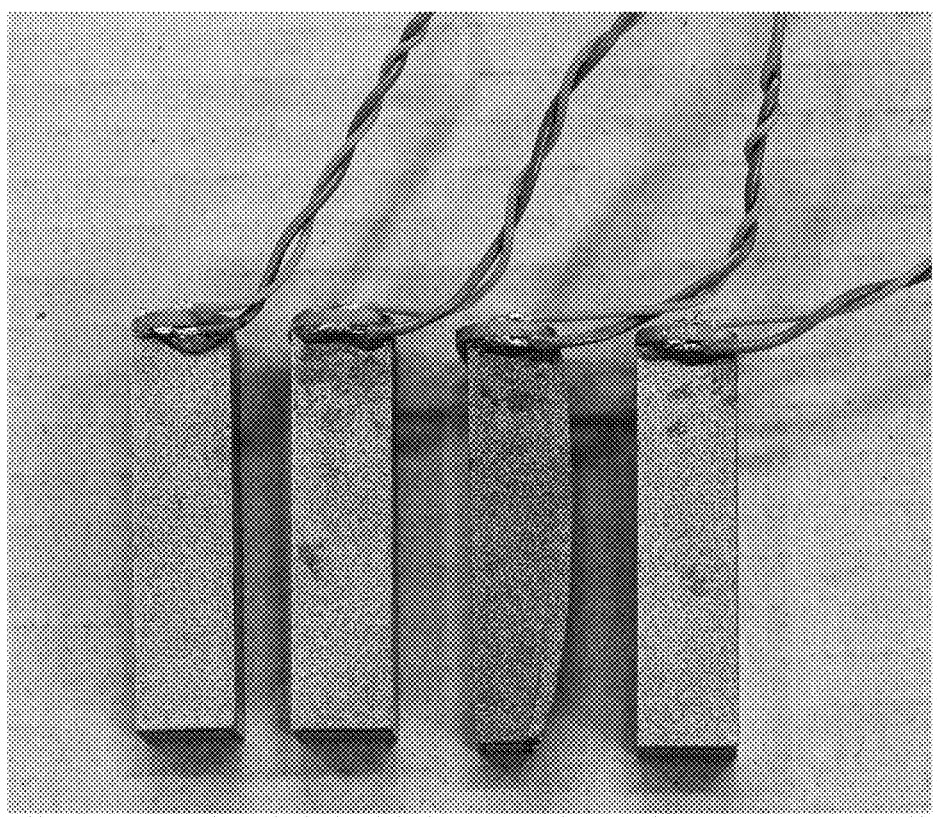
FIG. 10 is an image of the metallic AM samples instrumented with piezoelectric transducers.
Figure 11A:
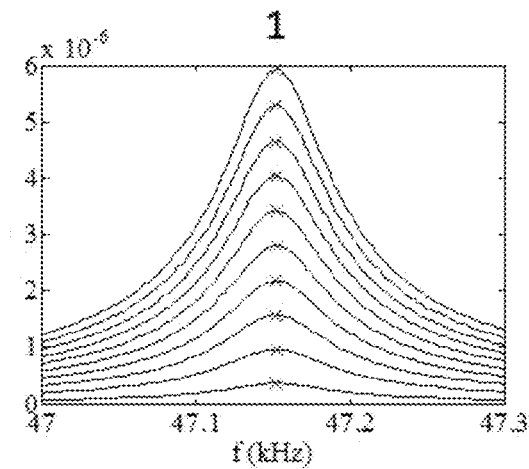
FIGS. 11A to 11D are graphs of the results of Quantification of nonlinear elasticity in metallic AM samples using Nonlinear Resonant Ultrasound Spectroscopy (NRUS) for Samples 1 to 4, respectively.
Figure 11B:
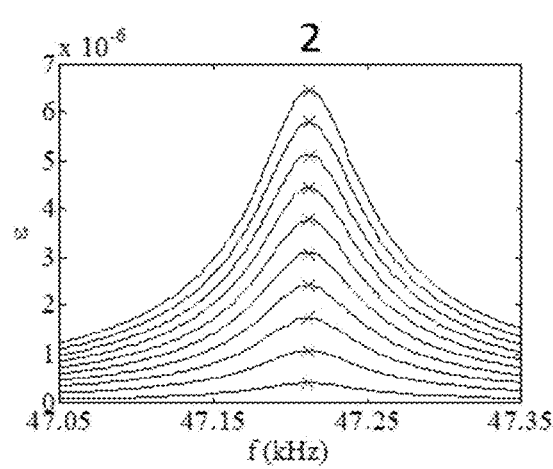
Figure 11C:
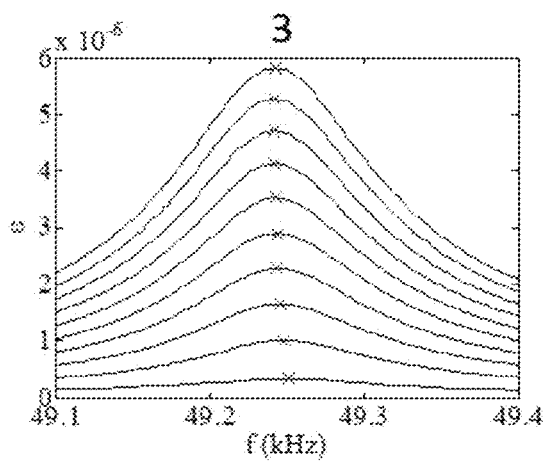
Figure 11D:
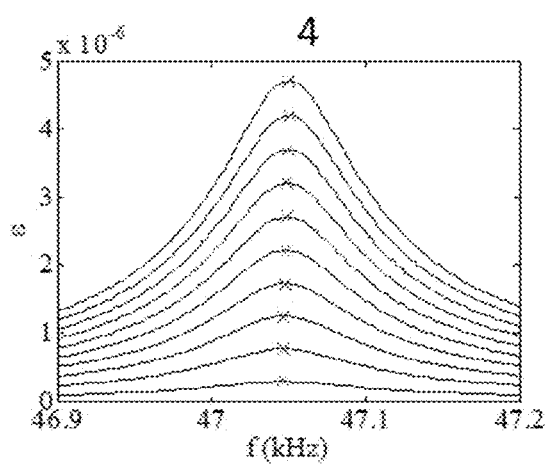
Figure 12A:
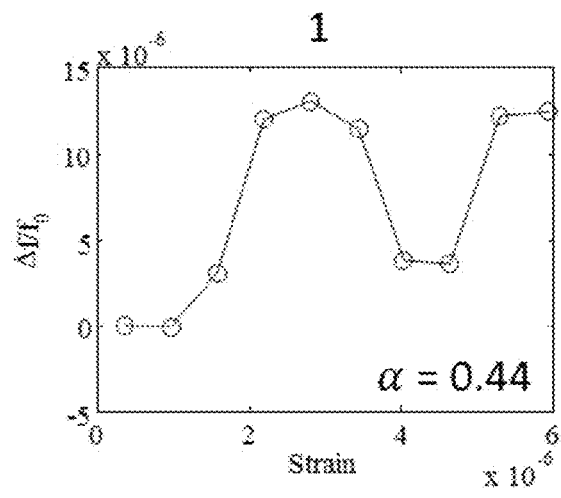
FIGS. 12A to 12D are the reduced data graphs of FIGS. 11A to 11D, respectively.
Figure 12B:
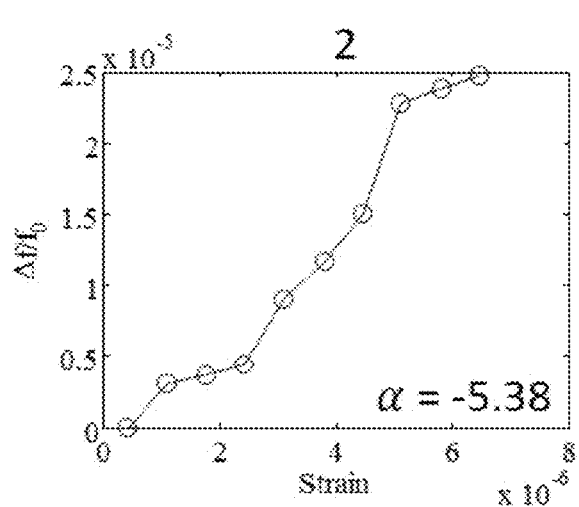
Figure 12C:
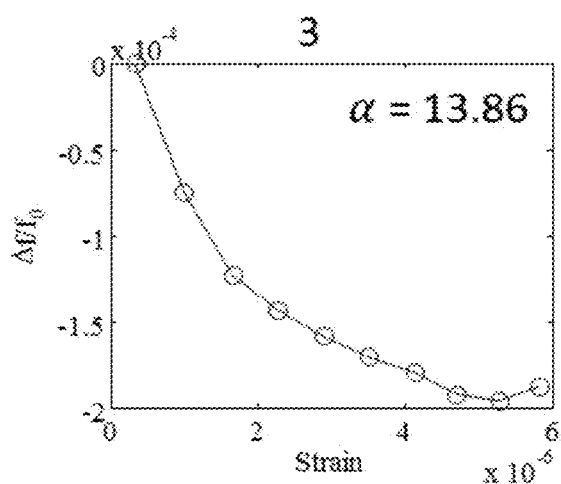
Figure 12D:
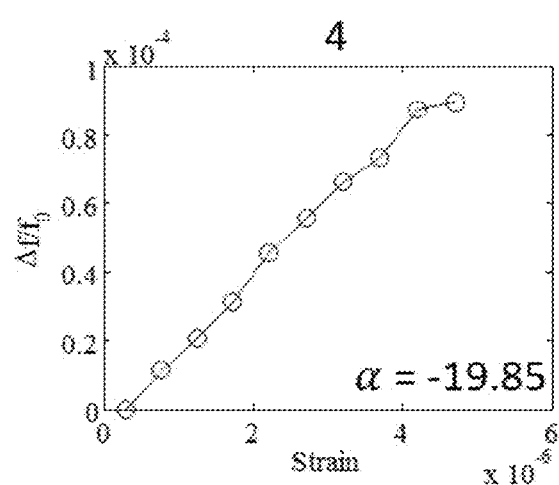

Samples 1 through 4 manufactured using additive manufacturing (AM) were examined. Each sample consisted of a 304 Stainless Steel column having a height of 2" and a square cross-section of ½"×½". Each sample was instrumented with a piezoelectric transducer for NRUS analysis, as shown in FIG. 10. Sample 1 was manufactured with optimal (or desirable) properties, while Samples 2 to 4 were manufactured with varying levels of damage (e.g., the samples were undermelted or overmelted). In other words, each of Samples 2 to 4 had less than optimal (or desirable) properties.

By way of illustration, NRUS is a technique during which a sample is excited with a harmonic signal at one point while the elastic response is recorded at another location. The source signal sweeps a frequency range around one resonance frequency of the sample with increasing source amplitudes, and the variation of the resonance frequency can be tracked as a function of the maximum strain in the sample. A pristine sample (e.g., an undamaged sample or a sample with substantially no damage) exhibits linear elastic properties, and the resonance frequency in such pristine sample is not strain dependent (e.g., the resonant peak does not change with increasing drive amplitude). In contrast, a damaged sample exhibits nonlinear elastic properties, and the resonance frequency in such sample varies as a function of strain, with the frequency variations increasing noticeably when the strain goes above a certain level. A sample with 1D-like geometry and free-boundary conditions is representative of a 1D unconstrained system. The results for such sample can then be interpreted analytically with a 1D equation of state.

Each of the Samples 1 to 4 was excited around a resonance peak for multiple excitation amplitudes. Results were plotted, and the graphs for Samples 1 to 4 are shown in FIGS. 11A to 11D, respectively. The data from the graphs in FIGS. 11A to 11D was reduced, and the reduced data graphs are shown in FIGS. 12A to 12D, respectively.

As can be seen from the graphs in FIGS. 12A to 12D, the parameter for nonlinearity was high for the damaged Samples 2 to 4, as compared with that of the optimal Sample 1. In particular, the absolute value of the slope of the relative shift as a function of the strain (a) for each of the Samples 2 to 4 was significantly higher than that of Sample 1.

Utilizing the techniques described above with reference to FIG. 1, anisotropy and/or defects may be detected if they exist within the part being produced. This detection may be performed utilizing RUS and/or NEWS (or NRUS) and may be performed either during production of the part or after the part is complete (as described above).

While the embodiments of FIGS. 1 and 2 utilize a laser vibrometer and a transducer, the present invention is not limited thereto and any mechanisms of inducing vibrations in the part may be utilized in place of the transducer and any means of detecting vibrations (e.g., any vibrometer) may be utilized in place of the laser vibrometer.

Aspects of embodiments according to the present invention relate to in-process, layer-by-layer non-destructive testing of additive manufactured components using linear and nonlinear vibrational resonance.

A relevant device or component (or relevant devices or components) according to embodiments of the present invention described herein may be implemented utilizing any suitable hardware (e.g., an application-specific integrated circuit), firmware (e.g., a DSP or FPGA), software, or a suitable combination of software, firmware, and hardware. For example, the various components of the relevant device(s) may be formed on one integrated circuit (IC) chip or on separate IC chips. Further, the various components of the relevant device(s) may be implemented on a flexible printed circuit film, a tape carrier package (TCP), a printed circuit board (PCB), or formed on a same substrate as one or more circuits and/or other devices. Further, the various components of the relevant device(s) may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Spatially relative terms, such as "top," "bottom," "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

As used herein, the terms "use," "using," and "used" may be considered synonymous with the terms "utilize," "utilizing," and "utilized," respectively.

As used herein, unless otherwise expressly specified, all numbers such as those expressing values, ranges, amounts or percentages may be read as if prefaced by the word "about," even if the term does not expressly appear. Further, the word "about" is used as a term of approximation, and not as a term of degree, and reflects the penumbra of variation associated with measurement, significant figures, and interchangeability, all as understood by a person having ordinary skill in the art to which this disclosure pertains. Any numerical range recited herein is intended to include all sub-ranges subsumed therein. Plural encompasses singular and vice versa. When ranges are given, any endpoints of those ranges and/or numbers within those ranges can be combined within the scope of the present disclosure.

Notwithstanding that the numerical ranges and parameters set forth herein may be approximations, numerical values set forth in the Experimental Examples section are reported as precisely as is practical. Any numerical value, however, inherently contains certain errors necessarily resulting from the standard variation found in their respective testing measurements.

Features described in relation to one or more embodiments of the present invention are available for use in conjunction with features of other embodiments of the present invention. For example, features described in a first embodiment may be combined with features described in a second embodiment to form a third embodiment, even though the third embodiment may not be specifically described herein.

Although this invention has been described with regard to certain specific embodiments, those skilled in the art will have no difficulty devising variations of the described embodiments, which in no way depart from the scope and spirit of the present invention. Furthermore, to those skilled in the various arts, the invention itself described herein will suggest solutions to other tasks and adaptations for other applications. It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents.

What is claimed is:

1. A method of measuring anisotropy within a part being created by an additive manufacturing system, the method comprising:
    inducing vibrations within the part via a transducer below the part;
    detecting a vibrational response of the part based on the induced vibrations via a laser vibrometer above the part; and
    measuring anisotropy within the part during creation of the part and based on the vibrational response.

2. The method of claim 1, wherein the additive manufacturing system is a powder bed fusion system.

3. The method of claim 1, wherein the additive manufacturing system is a three-dimensional (3D) printer.

4. The method of claim 1,
    wherein the inducing vibrations in the part comprises oscillating the part at multiple successive frequencies within a defined frequency band, and
    wherein the detecting the vibrational response comprises detecting a magnitude and a phase of the vibration within the part.

5. The method of claim 1,
    wherein the method further comprises determining whether a defect exists in the part,
    wherein the inducing vibrations in the part comprises oscillating the part at one or more vibrational resonance modes of the part at multiple amplitudes, and
    wherein the detecting the vibrational response comprises measuring a shift in a resonance frequency of the part based on the multiple amplitudes.

6. The method of claim 1, wherein the measuring of anisotropy within the part comprises quantifying an elastic tensor of a material of the part.

7. A method of manufacturing a part by an additive manufacturing system, the method comprising:
    producing a portion of the part by the additive manufacturing system, the produced portion being a layer of the part being manufactured by the additive manufacturing system;
    inducing vibrations within the produced portion via a transducer below the part;

detecting a vibrational response of the produced portion based on the induced vibrations via a laser vibrometer above the part; and measuring anisotropy within the produced portion based on the vibrational response.

8. The method of claim 7, wherein the additive manufacturing system is a powder bed fusion system.

9. The method of claim 7, wherein the additive manufacturing system is a three-dimensional (3D) printer.

10. The method of claim 7, wherein the inducing vibrations in the produced portion comprises oscillating the produced portion at multiple successive frequencies within a defined frequency band, and wherein the detecting the vibrational response comprises detecting a magnitude and a phase of the vibration within the produced portion.

11. The method of claim 7, wherein the method further comprises utilizing nonlinear elastic wave spectroscopy to determine whether a defect exists within the produced portion, wherein the inducing vibrations in the produced portion comprises oscillating the produced portion at one or more vibrational resonance modes of the produced portion at multiple amplitudes, and wherein the detecting the vibrational response comprises measuring a shift in a resonance frequency of the produced portion based on the multiple amplitudes.

12. The method of claim 7, further comprising:

adjusting a parameter of the additive manufacturing system to remedy any detected defects and/or anisotropy.

13. The method of claim 12, wherein the adjusting is performed after the producing of the layer of the part and before producing another layer of the part.

14. The method of claim 7, wherein the measuring of anisotropy within the produced portion comprises quantifying an elastic tensor of a material of the produced portion.

* * * * *